July 8, 1969 C. VICTORIUS 3,454,516

DYADIC POLYMERIC PRODUCTS

Filed Aug. 17, 1965

INVENTOR
CLAUS VICTORIUS

BY Frederick F. Butz

ATTORNEY

United States Patent Office 3,454,516
Patented July 8, 1969

3,454,516
DYADIC POLYMERIC PRODUCTS
Claus Victorius, Media, Pa., assignor to E. I. du Pont de Nemours and Company, Wilmington, Del., a corporation of Delaware
Continuation-in-part of application Ser. No. 136,856, Sept. 8, 1961. This application Aug. 17, 1965, Ser. No. 480,381
Int. Cl. C08f 29/48, 29/50, 29/36
U.S. Cl. 260—29.6          16 Claims

ABSTRACT OF THE DISCLOSURE

This invention is directed to dyadic polymeric materials which comprise soft-phase polymers having particular monomer compositions, into which are infused or dissolved hard-phase polymers having monomer compositions different from the soft phases. These dyadic polymeric materials are useful as film-formers in coating compositions.

---

This application is a continuation-in-part of application Ser. No. 136,856, filed Sept. 8, 1961, now abandoned.

This invention relates to novel dyadic acrylic interpolymers, to aqueous dispersions of these interpolymers and to coating compositions in which the interpolymers are the principal film-forming ingredients. The invention more particularly relates to dyadic acrylic interpolymers which comprise soft phase polymer particles into which are infused or dissolved a hard phase polymer.

The dyadic interpolymers of the invention are useful as film-forming components in coating compositions. Films formed from such coating compositions are markedly superior to films of coating compositions having conventional film-forming polymers, and surprisingly are better than those which contain film formers having the same over-all monomer compositions and equivalent or higher molecular weights. For example, films of the polymers of the invention are more resistant to deformation at elevated temperatures and have greater flexibility at room temperature, with at least equal craze resistance and resistance to checking at low temperature, than comparable conventional polymers. And compared to physical mixtures or blends of hard polymers with soft polymers having comparable monomer compositions, the dyadic interpolymers of the invention have better film clarity on elongation and better solvent resistance, and their latices have better freeze-thaw resistance. Compared to their reverse non-dyadic counterparts, which are prepared by polymerizing the hard phase first, the dyadic interpolymers have greater toughness and extensibility, better clarity on elongation and better solvent resistance.

All these enhanced properties, taken together, make the polymers of the invention particularly suited for use in high quality coating compositions.

THE POLYMERS

The polymers of the invention comprise soft phase polymers which have infused or dissolved in them relatively hard phase polymers. It is this arrangement which confers upon the polymers their desirable qualities. The polymers are termed "dyadic" in this specification because, although they are composed of two types of polymers, the hard phase is infused into the soft in such a fashion that they become a substantially homogeneous composition.

Figure 1:
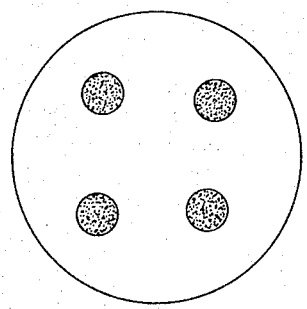
Figure 2:
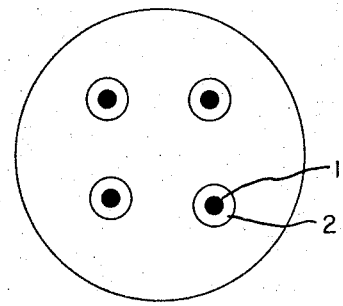
Figure 3:
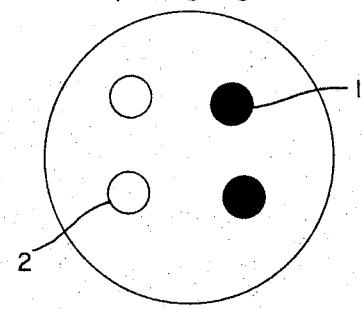

This phenomenon is illustrated in the drawings, in which the larger circles represent polymer dispersions. FIGURE 1 shows a dyadic polymer of the invention. The homogeneity of the composition is obvious. FIGURE 2 shows a reverse non-dyadic interpolymer having the same over-all composition as that of FIGURE 1, but prepared by polymerizing the hard phase first. This gives a shell of the soft phase polymer (1) about a hard phase polymer core (2). FIGURE 3 shows a physical mixture of a soft phase polymer (1) and a hard phase polymer (2).

The soft phase polymer is formed from a monomer composition which comprises:

(a) 20–93% of an ester of acrylic acid, the alcohol portion having 2–12 carbon atoms, or methacrylic acid, the alcohol portion having 6–12 carbon atoms. (Illustrative of these are ethyl acrylate, butyl acrylate hexyl methacrylate, 2-ethyl-hexyl acrylate and lauryl methacrylate),
(b) 0–75% of butyl methacrylate,
(c) 0–40% of an ester of methacrylic acid, the alcohol portion having 1–3 carbon atoms, and
(d) 0–8% of acrylic acid, methacrylic acid or itaconic acid.

The hard phase polymer is formed from a monomer composition which comprises (a) 0–58% of an ester of acrylic acid, the alcohol portion having 2–12 carbon atoms, or methacrylic acid, the alcohol portion having 6–12 carbon atoms,
(b) 0–60% of butyl methacrylate,
(c) 35–100% of an ester of methacrylic acid, the alcohol portion having 1–3 carbon atoms, and
(d) 0–8% of acrylic acid, methacrylic acid or itaconic acid.

It should be understood that cyclic forms, aromatic forms and alkoxy alkyl esters of these monomers can also be used.

The monomer compositions must be so constituted that each contains at least 35% of its own weight of monomers which are common to the other monomer composition. The soft phase monomer composition must also contain at least 20% of its own weight more of the (a) monomers than the hard phase composition, and the hard phase composition must contain at least 30% of its own weight more of the (c) monomers than the soft phase composition.

In the product, the ratio of soft phase polymer to hard phase polymer must range from 3:1 to 1:3. The product must also contain at least 1%, by weight, of acid (d) units.

Preferred for the excellence of films obtained when it is used as a film-forming ingredient in coating compositions is a dyadic interpolymer whose soft phase monomer composition comprises:

20–50% ethyl acrylate,
43–75% butyl methacrylate and
5–7% methacrylic acid, and whose hard phase monomer composition comprises 40–60% methyl methacrylalte,
35–55% butyl methacrylate and
5–7% methacrylic acid.

This composition will contain 40–70%, by weight, of the soft phase polymer.

Also preferred, for the same reason, is a dyadic interpolymer whose soft phase monomer composition comprises 15–40% methyl methacrylate,
55–85% ethyl acrylate and
0–5% methacrylic acid, and whose hard phase monomer composition comprises 60–100% methyl methacrylate,
0–35% ethyl acrylate and
0–5% methacrylic acid.

This composition must contain a minimum of 3% of acid units, based on total monomer content. It must also contain 30–75%, by weight, of the soft phase. The soft phase must contain 40–60% more ethyl acrylate than the hard phase, and the hard phase must contain 40–60% more methyl methacrylate than the soft phase.

Although the soft and hard phase monomer compositions just described give dyadic interpolymers having advantages over those previously used, it may be desirable at times to add small amounts of other monomers to either or both of the monomer compositions. For example, materials such as glycidyl methacrylate, vinyl aromatic compounds such as styrene, or methacrylamide can be used to make minor alterations in polymer properties and dispersion characteristics. Monovinyl ester, -ether and -acetal compounds can also be used. When such adjuncts are used, they can be incorporated into the monomer compositions in proportions up to 10 or 15% by weight of the total monomer composition.

So far as the relative hardness and softness of the polymer phases of the dyadic interpolymers is concerned, it has been found that, generally, the overall film properties of the final polymers are optimum if the soft phase is as soft as possible and the hard phase is as hard as possible, within the limits already set out. This gives polymers having better print and craze resistance, and which give minimum difficulty in coalescing a film.

POLYMER PREPARATION

The polymers of the invention can be made by a two-stage emulsion polymerization process. In the first stage, the soft phase monomer composition, 1 to 10 times the volume of the monomer composition of deionized water, 0.1% to 3.0% of total monomer of an emulsifier, and 0.01–1.0 mole percent, of the soft phase monomer content, of a water soluble polymerization initiator are charged to a reactor, stirred and heated to about 40–70° C. After polymerization is about 90% complete, as determined by solids content, the hard phase monomer composition is slowly added, preferably at a rate of less than five volume percent per minute, and preferably along with additional 0.01–1.0 mole percent based on the hard phase monomer content of water soluble initiator. The initiator can be added in single or multiple portions. The mixture is stirred and the temperature kept within 50–100° C. until polymerization is 90%, preferably 95%, complete. The contents of the reaction vessel are then cooled to 25–40° C. for removal. A solid polymer can be obtained from the resulting dispersion by coagulation with acids, salts or water miscible solvents such as propanol, filtration, washing and drying.

The emulsifiers used in the polymerization are preferably anionic surfactants, or blends of non-ionic surfactants with anionic surfactants. Generally speaking, the cationic types are less desirable because of their potential reactions with the acidic monomers. Illustrative of the anionic surfactants which can be used are the sodium sulfonates of decyl benzene, dodecylbenzene, and styrene; sodium lauryl sulfate; sodium coconut acid isethionate; and the sodium alkyl aryl polyoxyethylene sulfates and phosphates.

The use of these emulsifiers will keep the particles of the soft phase polymer under 0.5 micron, preferably under 0.2 micron, in size. Particles larger than this, when exposed to the hard phase monomers, may not be completely penetrated and so may fail to give a wholly dyadic product.

Free radical generators which are soluble in the polymerization medium are preferred as polymerization initiators. Illustrative of these are hydrogen peroxide and the alakli metal and ammonium persulfates, perborates and percarbonates. In a redox system, cambinations of these initiators with sulfites, thiosulfates and other reducing agents can also be used. Transition metal ions, e.g., ferrous ions, can be added as redox reaction promoters.

Although the foregoing description is limited to a simple two-stage process, it should be understood that other multi-phase dyadic interpolymers can be made in the same general way by using alternate methods of monomer addition, or by introducing additional hard or soft phase monomer compositions. Multiphase interpolymers which result from such processes, whenever they are products of the infusion polymerization of a hard polymer phase into a softer phase of an earlier stage, are inherently dyadic in character and are considered to be within the scope of the invention.

UTILITY

The aqueous dispersions formed in the preparation of the dyadic interpolymers of the invention can be used directly as coating compositions. They may also be compounded with pigments, extenders, stabilizers, plasticizers, solvent coalescent aids, fungicides and other ingredients well known in this art. The dispersions may also be blended with such other film-forming components as are well known in the art to obtain desirable balances of properties. For increased stability, the dispersions should be adjusted to a pH of 6–10, preferably 7–9, with aqueous ammonia or other volatile mono-amino organic compounds as triethanol amine or morpholine.

The coating compositions can be used to coat metal, wood, plastic, fabric, leather, paper, fibers and the like. The compositions may be applied to these substrates by any conventional method such as brushing, spraying, roller-coating, dipping, and the like.

If the compositions are to be air dried, it is desirable that they contain a solvent coalescing agent such as the butyl ether of ethylene or diethylene glycol, diacetone alcohol, ethylene carbonate, dimethyl formamide or butyrolactone. For a more durable product, it may also be desirable to give the film a final treatment at an elevated temperature.

EXAMPLES

Th following examples are presented so that the invention will be more easily understood and more readily practiced. In the examples, all proportions are by weight and the polymers which are formed are described briefly and symbolically as (soft phase polymer composition) ←(hard phase polymer composition), which indicates that the hard polymer phase described on the right is infused or dissolved into the softer phase described on the left. The relative proportions of monomer units in each polymer phase are given in numbers following the polymer description. The proportion of each monomer composition in the polymer is given by the numbers within the parentheses.

A list of abbreviations for the monomers used in the examples follows:

|  | Acrylic | Methacrylic | Itaconic |
| --- | --- | --- | --- |
| The acid | AA | MAA | IA |
| Methyl |  | MMA |  |
| Ethyl | EA | EMA |  |
| n-Butyl | BA | BMA |  |
| n-Hexyl |  | HMA |  |
| 2-ethylhexyl | 2-EHA |  |  |
| Lauryl |  | LMA |  |
| Glycidyl |  | GMA |  |
| Amide |  | MAAm |  |

EXAMPLE 1

A 3-neck round bottom flask equipped with a stirrer, a graduated dropping funnel, a reflux condenser, a thermometer and a nitrogen inlet was charged with 1,286 parts of deionized water, 2.0 parts of ammonium persulfate, 20.0 parts of a 30% aqueous solution of dodecyl benzene sodium sulfonate and 0.168 part of sodium metabisulfite. After these components were in solution, 200 parts of BMA, 140 parts of EA and 60 parts of MMA were added, the unit flushed with nitrogen and heated to about 55° C. to initiate the reaction.

After 24 minutes, the temperature had reached a peak of 85° C. A sample for solids determination was taken and the conversion was found to be 95% complete.

The first stage polymerization was considered completed at this point and the second stage was started by adding a mixture of 300 parts of BMA, 276 parts of MMA and 24 parts of MAA from the dropping funnel slowly over a period of 82 minutes, while holding the temperature of the reaction mixture at 85–87° C. After an additional 87 minutes at this temperature, the polymerization of the second stage was considered complete.

The resulting dyadic interpolymer dispersion, EA/BMA/MMA 35:50:15 ←BMA/MMA/MAA 50:46:4 (40/60) had a solids content of 43.3% and showed 99% over-all conversion. At a pH of 1.9 it had a Gardner-Holdt viscosity of E, which dropped to D on adjustment to a pH of 9.7 with 15 ml. of concentrated ammonium hydroxide. This dispersion had excellent freeze-thaw stability.

A film cast with a 10 mil doctor knife on a glass panel and baked for 30 minutes at 225° F. was clear, colorless and tough and remained clear on elongation. It showed a print resistance[1] of 7, a Tukon hardness[2] of 5.6 Knoop, and only very slight crazing.[3] The film showed no change on immersion in water for one week at 100° F. It is useful as a high quality coating interpolymer.

A repeat of the above preparation was made in which the charge was cooled to about 58° C. after completion of the first stage polymerization. All of the second monomer composition and an additional 0.25 gram of sodium metabisulfite were then added. The temperature was then allowed to rise adiabatically and was maintained at 87–88° C. After 86 minutes, the dispersion had a solids content of 43.0%, equal to 98.4% conversion. Films cast from the dispersion, after pH adjustment with ammonia, had properties equivalent to the first polymer.

EXAMPLE 2

A stainless steel jacketed reactor equipped with cooling coil, a high-speed agitator, inlets for ingredient addition, two dropping funnels and a condenser was charged with 3,894 parts of deionized water, 84 parts of a 25% aqueous solution of dodecylbenzene sodium sulfonate, and 0.71 part of sodium metabisulfite. The charge was stirred until the ingredients were dissolved and a mixture of the soft phase monomers, 700 parts of BMA, 490 parts of EA, 126 parts of MMA and 84 parts of MAA was added. The monomers of the hard phase, 1,050 parts of BMA, 105 parts of EA, 819 parts of MMA and 126 parts of MAA were placed in one of the dropping funnels. In the other were placed 9.7 parts of ammonium persulfate dissolved in 543 parts of deionized water.

The reactor was closed, agitation was started, the air space was purged with nitrogen gas and the temperature of the contents was raised to 60° C. At this point, 192 parts of the persulfate solution were added to initiate polymerization of stage 1. The charge was maintained at 57–58° C. until exothermic reaction started and was then allowed to react without further heating. After 29 minutes, the temperature began to fall from a peak of 88° C. after this first exotherm, and the conversion to polymer was 97.6%.

The hard phase composition was then run into the reactor slowly, over a period of 77 minutes. Starting at the same time, the remainder of the persulfate solution was added in four separate portions in the respective ratio of 6:5:4:3, at 20-minute intervals. The temperature of the reactor was maintained at 86–88° C. with agitation during the monomer addition period and for about 60 minutes thereafter. At the end of this period, the contents of the reactor were cooled to 25° C. and removed by filtration through a 100-mesh stainless steel screen. A homogeneous dispersion of EA/BMA/MMA/MAA 35:50:9:6 ←EA/BMA/MMA/MAA 5:50:39:6 (40/60), having a Gardner-Holdt viscosity of E and 43.6% solids resulted. Over-all conversion to polymer was 99.2%.

The dispersion was brought to pH 8.5 with concentrated ammonium hydroxide, and with a 10 mil doctor blade a film was cast on a glass panel which was then baked for 30 minutes at 225° F. The film was clear, colorless, smooth and flexible. It was also tough, had excellent adhesion and remained clear on elongation. It had a print resistance value of 7 at 150° F. and showed only a trace of crazing at 60° F. with methyl ethyl ketone, and had a Tukon hardness of 7.5 Knoop. Treatment drop-wise with high-test premium grade gasoline, followed by evaporation, provided a slight surface softening but no permanent mark.

EXAMPLE 3

Using a larger version of the equipment of Example 2, a polymer dispersion having a different balance of film properties was prepared as follows:

To the reactor was charged 84½ parts of deionized water, 1.73 parts of a 25% aqueous solution of dodecylbenzene sodium sulfonate, 0.10 part of ammonium persulfate, and 0.021 part of sodium metabisulfite. After these components had dissolved, 16.74 parts of BMA, 14.40 parts of EA and 2.34 parts of MAA were added. The reactor was closed, agitated, purged with nitrogen and heated to 50° C. to initiate polymerization.

At the end of 11 minutes, the batch had reached a peak temperature of 86° C. and had begun to cool. At this point, the contents of the larger dropping funnel, consisting of 19.26 parts of BMA, 16.56 parts of MMA and 2.70 parts of MAA were added slowly to the reactor at the rate of 0.06 part per minute.

Starting at the same time, the initiator contents of the second dropping funnel, consisting of 0.12 part of ammonium persulfate dissolved in 6.56 parts of deionized water, were added in three separate portions in the respective ratio of 6:5:4, at 22-minute intervals. As these ingredients were added, the temperature of the contents of the reactor was raised to about 87° C. and maintained at that temperature during the monomer addition period and for one hour thereafter. The contents of the reactor were then cooled to 25° C. and removed by filtration through a 100-mesh stainless steel screen.

The resulting homogeneous dispersion of EA/BMA/MAA 43:50:1 ←BMA/MMA/MAA 50:43:7 (46.5/53.5) had a solids content of 43.4% indicating an over-all conversion of 98.5%. It had a pH of 8.0 and a Gardner-Holdt viscosity of E, which increased to Z-6 on adjustment to a pH of 8.5 with concentrated ammonium hydroxide.

Films of this dispersion, 3 mils thick, were cast on glass panels and baked for 30 minutes at 225° F. The films were flexible, tough, remained clear at an ultimate elongation of about 50%, had a print resistance of 7 and a Tukon hardness of 6.0 After wetting with methyl ethyl ketone (MEK) and letting the solvent evaporate, the films were clear with only a slight blue haze, indicating compatibility of the polymer components. No crazing was evident after treatment with MEK at 60° F. High-test gasoline produced some surface softening but, upon

---

[1] Print resistance is determined by preparing a dry continuous film of the subject polymer composition on a metal or glass panel, sandwiching a piece of clean cotton cheesecloth between the film and a 1 lb. weight bearing on a ¼ square inch area (4 p.s.i.) and placing the assembly in an over at 150° F. for one hour. At the end of this time the panel is removed, cooled, examined for a residual print of the cheesecloth, and rated according to the scale:

(10) no visible print
(8) barely visible shallow impression of only part of the fabric
(7) barely visible shallow impression of the whole fabric
(6) definite printing of the whole fabric
(5) medium printing—no adhesion of the cloth
(4) severe printing—slight adhesion of cloth
(3) bad printing—adhesion and imbedding of cloth.

[2] Determined by ASTM D-1474-57T.

[3] Craze resistance is determined by conditioning a prepared dry film of the polymer for 30 minutes at 60° F. and 40% relative humidity, placing one drop of methyl ethyl ketone on the surface and allowing it to dry. The surface is then examined for cracking or crazing.

evaporation, left no permanent marks on the film.

To illustrate the improved balance of properties of this dyadic interpolymer over the non-dyadic polymers, three different interpolymers (1, 2 and 3) were prepared and cast as films in the same manner.

The first (1) was an inverse interpolymer whose composition was identical to the above but made by starting with the hard phase and finishing wih the soft phase.

The second (2) was a physical mixture of separately made copolymer dispersions of the soft phase and the hard phase compositions. The third (3) was a single stage copolymer of both the soft and hard phase monomer compositions, polymerized together. The properties of these polymer compositions follow:

to PH 8.5 with ammonia, showed excellent freeze-thaw stability.

EXAMPLE 6

A polymer dispersion,

EA/MMA 85:15←EA/MMA/MAA 35:60:5 (30/70)

was prepared as in Example 4. Films from this dispersion remained clear at an ultimate elongation of about 150%, showed no crazing with MEK treatment at 60° F., had a print resistance of 5 and a Tukon hardness of 6.4 Knoop. The dispersion, adjusted to pH 8.5 with ammonia, showed excellent freeze-thaw stability.

|  | Example 3 | (1) Inverse | (2) Mixture | (3) Single Stage |
|---|---|---|---|---|
| Flexibility | Excellent | Fair | Fair | Stiff. |
| Toughness | do | Brittle | do | Fair. |
| Ultimate elongation | 50% | 10% | 30% | <10%. |
| Clarity on elongation | Excellent | Hazy | White | Good. |
| Print resistance at 150° F | 7 | 7 | 8 | 5. |
| Craze resistance 60° F. MEK | Excellent | Excellent | Excellent | Poor. |
| Tukon hardness | 6.0 | 5.6 | 3.6 | 9.6. |
| High-test gasoline spot resistance | Good | Poor | Poor | Good. |
| Freeze-thaw stability | do | Good | Fair | Do. |
| Inherent viscosity (0.2% in MEK) | 1.16 | 1.55 | 1.56 | 1.16. |

EXAMPLE 4

Into the equipment of Example 1 were charged 24 parts 25% dodecyl benzene sodium sulfonate solution in water
1,120 parts deionized water
1.0 part ammonium persulfate
0.22 part sodium metabisulfite
300 parts of soft phase monomer composition containing 55 parts EA, 40 parts MMA and 5 parts MAA.

The equipment was closed, flushed with nitrogen and heated to 60° C. to initiate the polymerization. After the first exotherm, 48 parts of a 1.67% aqueous ammonium persulfate solution were added, followed by another 450 parts of the soft phase monomer composition added at 9.5 parts/minute. During this addition a 40 part and a 32 part portion of the persulfate solution were added at 20-minute intervals.

After the temperature had been maintained at 87° C. for 15 minutes, 250 parts of the hard phase monomer MMA were added at 9.2 parts/minute, and after 6½ minutes, 24 parts of the persulfate solution were added. After about 80 minutes at this temperature, a conversion of 99% was obtained, with a solids content of 43.5%.

This dispersion, neutralized with ammonia, was stable to freeze-thaw cycles and formed tough films after coatings were cast on glass and baked. These films remained clear on elongation, showed a print resistance of 6, a Tukon hardness of 8.3 Knoop and no crazing with MEK at 60° F.

This dyadic interpolymer,

EA—MMA/MAA 55:40:5←MMA 100 (75/25)

was a useful coating material.

EXAMPLE 5

Using the process of Example 4, a polymer dispersion, EA/BMA/MAA 20:75:5←BMA/MMA/MAA 35:60:5 (70/303) was prepared.

Films, 3 mils thick, prepared on glass panels as before, were flexible, tough and remained clear at an ultimate elongation of about 50%. The print resistance was more than 6, there was no crazing by MEK at 60° F. and the Tukon hardness was 3.4 Knoop. The dispersion adjusted

EXAMPLE 7

Using the process of Example 2, a EA/EMA/MMA 65:30:5←EMA/MMA 95:5 (46.5/53.5) dispersion was prepared. This dispersion had good freeze-thaw stability after neutralization and gave a cast film that remained clear at an ultimate elongation of about 100%, was tough and flexible, showed no crazing with MEK, had a print resistance of more than 6 and a Tukon hardness of 5.1. Treatment with high-test gasoline produced no permanent mark on the film.

EXAMPLE 8

Using the process of Example 2, a polymer dispersion BA/EMA/MAA 54:40:6←EMA/MAA 94:6 (46.5/53.5) was prepared. Films similar to those prepared in Example 7 were obtained.

EXAMPLE 9

A polymer dispersion,

2-EHA/MMA/MAA 73:20:7←EHA/MMA/MAA 33:60:7 (46.5/53.5)

was prepared by the process of Example 8. Films having properties comparable to those of the films of Example 7 were obtained.

EXAMPLE 10

Using the process of Example 2, a polymer dispersion, HMA/MAA 93:7←HMA/MMA/MAA 58:35:7 (40/60) was prepared. Films from this dispersion were flexible, remained clear on elongation, showed no crazing with MEK, had a print resistance of 7 and a Tukon hardness of 4.0 Knoop.

EXAMPLE 11

A EA/MMA/MAA 76:22:2←EA/MMA/MAA 28:67:5 (40/60) polymer was prepared as follows:

In the equipment of Example 1 were placed 1267 parts of deionized water, 29 parts of a 25% aqueous solution of dodecyl benzene sodium sulfonate, 0.35 part of sodium metabisulfite and 14 parts of a ferrous sulfate solution containing 100 p.p.m. of iron. To this were added 105.6 parts of MMA, 364.8 parts of EA and 9.6 parts of MAA. The reactor was closed, flushed with nitrogen, and the contents heated to 50° C. Then 96 parts of a solution of 4.13 parts of ammonium persulfate in 237 parts of deionized water were added to the reactor to initiate the first exotherm, and the temperature was allowed to rise to and was kept at 87° C. over a period of about 10 minutes. A solids determination taken at this point showed 96.7% conversion.

Following this, 48 parts of the persulfate solution were charged to the reactor and a mixture of 482 parts of MMA, 202 parts of EA and 36 parts of MAA was then allowed to drip into the reactor at a rate of about 9.4 parts/minute. Additional amounts of persulfate were added at 19-minute intervals during the polymerization: 40, 32 and 24 parts respectively. The temperature was maintained at 87–88° C. during the monomer addition and for one hour thereafter.

The resultant dispersion was then cooled at 25° C., removed and filtered through a 100-mesh screen. A solids content of 43.9% was determined, equivalent to a total conversion of 99.6%.

To illustrate the differences between the dyadic interpolymer of this example over the non-dyadic interpolymers of similar compositions, three separate copolymer dispersions (4, 5 and 6) were prepared and made into films: The first (4) was the inverse of that of this example, made by starting with the hard phase and finishing with the soft phase, but otherwise prepared identically. The second (5) was a physical mixture of the soft phase and the hard phase polymers, each prepared as separate single stage copolymer dispersions. The third (6) was a single stage polymerizate of the soft phase monomer composition mixed with the hard phase monomer composition. All compositions were adjusted to pH 8.5 with ammonium hydroxide. A comparison of the properties of films, 3 mils thick, cast as dispersions on glass panels and baked 30 minutes at 225° F. follows:

The reactor was purged of oxygen, closed and the contents heated to 62° C. to initiate the exotherm. After the temperature had risen to 77° C. and the batch had been heated to 85° C. in a total time of 34 minutes, a solids determination showed 92.2% conversion. There were then added 48 parts of a solution of 1.95 parts of ammonium persulfate dissolved in 143.5 parts of deionized water, and drop-wise addition was started of a mixture of 381.6 parts of HMA, 288.0 parts of MMA and 50.4 parts of MAA at the rate of 9 parts per minute. Successive portions of the persulfate solution, 40 parts, 32 parts and 24 parts respectively, were added at 20-minute intervals and the temperature was maintained between 86–88° C. for 2⅓ hours.

At the end of the reaction, the contents were cooled to 25° C., filtered through a 100-mesh screen and found to have a pH of 2.1, a viscosity of T and a solids content of 42.5%, equal to 96.5% conversion. The resulting dispersion, HMA/LMA/MAA 78:15:7 ← HMA/MMA/MAA 53:40:7 (40/60), was adjusted to a pH of 8.5 with aqueous ammonia and found to have excellent freeze-thaw stability.

Films prepared from this dispersion were tough and flexible, remained clear on elongation to 30%, had a print value of 7, showed no crazing by MEK at 60° F. and had a Tukon hardness of 4.7 Knoop.

EXAMPLE 15

An interpolymer, EA/HMA/MMA/MAA 32:53:8:7 ←HMA/MMA/MAA 53:40:7 (46.5/53.5), was prepared by the method of Example 14. A stable dispersion of 43.9% solids at 99.7% conversion, having a Gardner-Holdt viscosity of 0 and a pH of 2.1 resulted. After adjustment to a pH of 7.5, films were cast and baked on glass. These were tough and flexible, remained clear on 100% elongation, had a print value of 5 and showed no solvent crazing with MEK at 60° F.

|  | Example 11 | (4) Inverse | (5) Mixture | (6) Single Stage |
|---|---|---|---|---|
| Flexibility | Excellent | Good | Good | Stiff. |
| Toughness | do | do | do | Good. |
| Ultimate elongation | >100% | 30% | 100% | 50%. |
| Clarity on elongation | Excellent | Hazy | White | Excellent. |
| Print resistance at 150° F | 7 | 6 | 7 | 3. |
| Tukon hardness | 5.8 | 4.3 | 4.2 | 9.0. |
| High-test gasoline spot resistance | Excellent | Softened | Softened | Softened. |
| Freeze-thaw stability | Excellent | Fair | Poor | Excellent. |
| Inherent viscosity | 0.94 | 1.90 | 1.63 | 1.55. |

EXAMPLE 12

A dispersion, EA/MMA/AA 76:22:2 ←EA/MMA/AA 28:67:5 (40/60), was prepared by the method of Example 11. It had 43.8% solids and a viscosity of W on the Gardner-Holdt scale after adjustment to pH of 8.1 with aqueous concentrated ammonia. The adjusted dispersion was not coagulated by freezing and thawing. Films equivalent to those described in Example 11 were obtained with this dispersion.

EXAMPLE 13

A dispersion, EA/MMA/IA 65:30:5←MMA/EA 75:25 (50/50), was prepared by the method of Example 11. This dispersion contained 43.6% solids and had a Gardner-Holdt viscosity of B. After adjustment to a pH of 8.5 with concentrated ammonium hydroxide, the dispersion was freeze-thaw stable.

EXAMPLE 14

The equipment of Example 1 was used. 1375 parts of deionized water, 29 parts of a 25% aqueous solution of dodecyl benzene sodium sulfonate, 0.97 part of ammonium persulfate and 0.21 part of sodium metabisulfite were charged to the reactor, followed by 374 parts of HMA, 72.0 parts of LMA and 33.6 parts of MAA.

EXAMPLE 16

A polymer was prepared as in Example 3, except that 1%, by weight based on the monomers, of a 50:50 by weight mixture of sodium lauryl sulfate and a polypropylene glycol polyethylene glycol adduct was used as the emulsifier. An interpolymer of substantially equivalent properties resulted. An equivalent dyadic interpolymer was also obtained by substituting an equivalent weight of sodium alkylaryl polyoxyethylene phosphate.

EXAMPLE 17

A polymer, EA/BMA/MMA/GMA/MAA 35:50:5:5:5←EA/BMA/MMA/MAA 5:50:39:6 (40/60), was prepared by the process of Example 11. This interpolymer produced a useful coating having a print value of 7 and a hardness of 7.8 Knoop. It was stiff, tough and remained clear on elongation to break.

EXAMPLE 18

A dispersion, EA/BMA/MMA/MAA/MAAm 35:50:9:2:4←EA/BMA/MMA/MAA 5:50:39:6 (40/60), was prepared by the method of Example 17 and was found to have equivalent properties.

EXAMPLE 19

A pigment dispersion containing 380 parts of titanium dioxide pigment and 1,000 parts of the dispersion of Example 3, adjusted to a pH of 7.5 with concentrated NH₄OH solution, was prepared by passing the mixture twice through a sand mill. To 1,000 parts of this pigment dispersion were then added, in order, slowly with stirring, 648 additional parts of the dispersion of Example 3 and 280 parts of a 60% solution of the butyl ether of diethylene glycol in deionized water.

The resulting white lacquer was adjusted to a pH of 7.7 by drop-wise addition of 6 N aqueous NH₄OH, reduced to spray viscosity with deionized water and then passed through a 100-mesh screen.

A 2 mil thick film was sprayed on a metal panel previously primed with an alkyd resin primer and a sealer based on a hydroxyaminoethyl methacrylate polymer, allowed to dry briefly in air and then baked 30 minutes at 225° F. in a circulating air oven. The film developed a high gloss on buffing and showed excellent adhesion and toughness. A good balance of craze and print resistance and hardness was obtained.

EXAMPLE 20

Coatings of the white lacquer of Example 19 and the clear lacquer of Example 11 (modified with 30%, based on the weight of polymer, of butyl ether of diethylene glycol) can be prepared on paper and wood. Drying these compositions for 60 minutes at 140° F. will produce satisfactory coatings having substantially the same properties as those which can be obtained with the unmodified compositions.

Similar coatings can be prepared by dipping woven fabrics, non-woven fabrics, wire and metal screening into the compositions and then drying them at 225° F. for 30 minutes. Air-dried films and coatings of these same compositions also give satisfactory though less hard films.

The claims are:

1. A polymeric material which comprises a soft phase polymer of a monomer composition comprising 20–50% ethyl acrylate,
43–75% butyl methacrylate, and
5–7% methacrylic acid, into which soft phase polymer is infused a hard phase polymer of a monomer composition comprising 40–60% methyl methacrylate
35–55% butyl methacrylate, and
5–7 methacrylic acid, said composition containing 40–70% by weight of the soft phase polymer.

2. A polymeric material which comprises a soft phase polymer of a monomer composition comprising 15–40% methyl methacrylate,
55–85% ethyl acrylate, and
0–5% methacrylic acid, into which soft phase polymer is infused a hard phase polymer of a monomer composition comprising 60–100% methyl methacrylate,
0–35% ethyl acrylate, and
0–5% methacrylic acid, the soft phase composition containing 40–60% by weight more of ethyl acrylate than the hard phase composition, and the hard phase composition containing 40–60% more methyl methacrylate than the soft phase composition, said polymeric material containing a minimum of 3% methacrylic acid units based on the total monomer content, and 30–75% by weight of the soft phase composition.

3. A polymeric material which comprises a soft phase polymer of a monomer composition comprising 43% ethyl acrylate,
50% butyl methacrylate, and
7% methacrylic acid into which soft phase polymer is infused a hard phase polymer of a monomer composition comprising 43% methyl methacrylate,
50% butyl methacrylate, and
7% methacrylic acid, said composition having a soft phase:hard phase ratio of 46.5:53.5.

4. A polymeric material which comprises a soft phase polymer of a monomer composition comprising 22% methyl methacrylate,
76% ethyl acrylate, and
2% methacrylic acid into which soft phase polymer is infused a hard phase polymer of a monomer composition comprising 67% methyl methacrylate,
28% ethyl acrylate, and
5% methacrylic acid, said composition having soft phase:hard phase ratio of 40:60.

5. An aqueous dispersion of the polymeric material of claim 1.

6. An aqueous dispersion of the polymeric material of claim 2.

7. An aqueous dispersion of the polymeric material of claim 3.

8. An aqueous dispersion of the polymeric material of claim 4.

9. A coating composition consisting essentially of an aqueous dispersion of the polymeric material of claim 1 adjusted to a pH of 6–10.

10. A coating composition consisting essentially of an aqueous dispersion of the polymeric material of claim 2 adjusted to a pH of 6–10.

11. A coating composition consisting essentially of an aqueous dispersion of the polymeric material of claim 3 adjusted to a pH of 6–10.

12. A coating composition consisting essentially of an aqueous dispersion of a polymeric material according to claim 4 adjusted to a pH of 6–10.

13. A coating composition according to claim 9 additionally containing a solvent coalescent aid.

14. A coating composition according to claim 10 additionally containing a solvent coalescent aid.

15. A coating composition according to claim 11 additionally containing a solvent coalescent aid.

16. A coating composition according to claim 12 additionally containing a solvent coalescent aid.

References Cited

UNITED STATES PATENTS

| | | | |
|---|---|---|---|
| 3,249,463 | 5/1966 | Carlee | 260—901 |
| 3,297,621 | 1/1967 | Taft | 260—29.6 |
| 2,795,564 | 6/1957 | Conn et al. | 260—29.6 |

SAMUEL H. BLECH, *Primary Examiner.*

H. ROBERTS, *Assistant Examiner.*

U.S. Cl. X.R.

117—161; 260—30.4, 32.6, 32.8, 33.2, 78.5, 80.8, 885